United States Patent
Oguro

(10) Patent No.: US 6,880,027 B1
(45) Date of Patent: Apr. 12, 2005

(54) SYSTEM AND METHOD OF EVALUATING UNIVERSAL SERIAL BUS FUNCTION

(75) Inventor: Toshiharu Oguro, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 459 days.

(21) Appl. No.: 09/659,779

(22) Filed: Sep. 11, 2000

(30) Foreign Application Priority Data

Sep. 9, 1999 (JP) .......................................... 11-256281

(51) Int. Cl.$^7$ ............................................. G06F 13/00
(52) U.S. Cl. ..................................... 710/107; 710/100
(58) Field of Search ................................. 710/107, 100, 710/29, 15, 113; 709/230; 717/168, 174

(56) References Cited

U.S. PATENT DOCUMENTS

| | | | | |
|---|---|---|---|---|
| 5,822,520 A | * | 10/1998 | Parker ......................... | 709/230 |
| 6,009,490 A | * | 12/1999 | Fukui et al. ................. | 710/113 |
| 6,067,628 A | * | 5/2000 | Krithivas et al. ........... | 713/340 |
| 6,141,705 A | * | 10/2000 | Anand et al. .................. | 710/15 |
| 6,205,498 B1 | * | 3/2001 | Habusha et al. .............. | 710/29 |
| 6,205,501 B1 | * | 3/2001 | Brief et al. .................. | 710/100 |
| 6,260,091 B1 | * | 7/2001 | Jayakumar et al. .......... | 710/113 |
| 6,434,643 B1 | * | 8/2002 | Ejiri ............................. | 710/58 |
| 6,434,744 B1 | * | 8/2002 | Chamberlain et al. ...... | 717/168 |
| 6,438,749 B1 | * | 8/2002 | Chamberlain ............... | 717/174 |
| 6,771,664 B1 | * | 8/2004 | Garney et al. .............. | 370/474 |

FOREIGN PATENT DOCUMENTS

| | | |
|---|---|---|
| JP | A 8-102755 | 4/1996 |
| JP | A 2000-267823 | 9/2000 |

* cited by examiner

*Primary Examiner*—Mark H. Rinehart
*Assistant Examiner*—Kim T. Huynh
(74) *Attorney, Agent, or Firm*—Young & Thompson

(57) ABSTRACT

The present invention provides a universal serial bus function evaluator connected between a computer and an universal serial bus function. The universal serial bus function evaluator comprises: a token storage memory for storing a token transmitted from the computer; a packet type judging circuit for judging a type of a return data packet returned from the universal serial bus function; and a functional circuit connected to the token storage memory for fetching IN token from the token storage memory and holding the same, and the functional circuit also being connected to the packet type judging circuit for receiving an information about the type of the return data packet from the packet type judging circuit, so that if the return data packet is of NAK type, then the functional circuit transmits the IN token held therein to the universal serial bus function, and if the return data packet is of either DAT type or STALL type, then the functional circuit cancels the held IN token.

8 Claims, 14 Drawing Sheets

F : flag
A : address
C : commend
FCS : frame check code
GA : termination code token format

SYSTEM AND METHOD OF EVALUATING UNIVERSAL SERIAL BUS FUNCTION

BACKGROUND OF THE INVENTION

The present invention relates to a system and a method of evaluating a universal serial bus function, and more particularly to a system and a method of evaluating universal serial bus function as peripheral device of personal computer, for example, printer and scanner.

FIG. 1 is a schematic view illustrative of a conventional system of evaluating function of universal serial buses as peripheral devices of personal computer, for example, printer and scanner. The word "universal serial bus" will hereinafter be referred to as "USB". The conventional system has a computer 101 for controlling an USB function evaluator in accordance with an evaluation test pattern programming software 102. The computer 101 performs conversion to binary data to generate token in accordance with the evaluation test pattern programming software 102. The conventional system has a parallel interface 103 and an USB function evaluator 104 which is connected through the parallel interface 103 to the computer 101. The token generated by the computer 101 is transferred through the parallel interface 103 to the USB function evaluator 104 for storing the token into the USB function evaluator 104. The conventional system also has an USB cable 106, an USB protocol monitor 105 and an USB function 107. The computer 101 is connected through the USB cable 106 to the USB function 107, wherein the USB protocol monitor 105 is provided on an intermediate point of the USB cable 106 for monitoring packets on the USB cable 106. Upon tuning a start switch ON of the USB function evaluator 104, the token is transmitted from the USB function evaluator 104 through the USB cable 106 to the USB function 107, during which the USB protocol monitor 105 provided on the USB cable 106 monitors packets on the USB cable 106 for allowing the USB function evaluator 104 to evaluate the USB function 107.

FIG. 2 is a block diagram illustrative of an internal configuration of the USB function evaluator in the conventional system of FIG. 1. The USB function evaluator 104 has a first channel selector 113, a memory 108, a second channel selector 114, a token transmitter circuit 109, and an oscillator 110. The token is transmitted from the computer 101 to the USB function evaluator 104. The token is stored in the memory 108. When a start switch 112 turns ON, a clock signal is transmitted from the oscillator 110 to the token transmitter circuit 109, whereby the token is transmitted from the token transmitter circuit 109 through an USBI/O buffer 111 to the USB function. The memory 108 has plural independent channel areas for independently storing individual tokens for individual tests. It the token from the computer 101 first enters into the first channel selector 113 for allowing the first channel selector 113 to select one of plural channels so that the token is stored into a selected one of the plural independent channel areas of the memory 108. The second channel selector 114 is provided for selecting one of plural channels so that the token stored in the selected one of the plural independent channel areas of the memory 108 is read out and then transmitted by the token transmitter circuit 109 through the USBI/O buffer 111 to the USB function. The above channel selection function of the USB function evaluator 104 promotes to reduce the number of writing token data in the memory 108.

The above conventional technique, however, has the following problems. The, first problem is that if the computer 101 conducts the test pattern programming, it is necessary to estimate or presume a packet length of a return packet from the USB function having received the token transmitted from the USB function evaluator 104, in order to set a sufficient idling time before the next token for avoiding the next packet from confliction with the return packet.

FIG. 3 is a diagram illustrative of the above-described first problem engaged with the conventional system. First, SetUp token is inputted (P1) to estimate ACK (normal response P2) as the return from the USB function for setting five idol time. Second, IN token is inputted (P4) to estimate return data packet of eight bytes (p8). In this case, in order to avoid confliction between the ACK token and the eight byte data, 120 idol time is set (P6). Third, IN token is inputted (p8) to estimate return data of two bytes (p9). In this case, in order to avoid confliction between the ACK token and the two byte data, 60 idol time is set (P10).

The second problem is that if the computer 101 performs the test pattern programming, it is necessary to estimate the time for completion of preparation by the USB function for the packet return for subsequent setting the return number or the idol time of the IN token. If the USB function accommodates a CPU performing a firmware process to return the data packet, then the necessary time for completing the preparation of the return data depends upon the performance and load state of the CPU of the USB function. It is necessary to return an NAK (response refuse) against the IN token until the preparation of the return data has been completed.

FIG. 4 is a diagram illustrative of the above-described second problem engaged with the conventional system of FIG. 1. At the time of transmission of IN token, the firmware process (S2) of the USB function has not completed the preparation of the return data, for which reason the NAK packet (P5) is returned from the USB function. At the time of transmission of the next IN token (P7), the firmware process (S2) of the USB function has not yet completed the preparation of the return data, for which reason the NAK packet (p8) is returned from the USB function. At the time of transmission of the IN token (P10), the firmware process (S3) of the USB function has already completed the preparation of the return data, for which reason the 8-bytes data packet is thus returned from the USB function. In this case, if the necessary time for the firmware process (S2) is not estimated, this makes it difficult to decide the program number (S1) if the IN token.

If at the worst, the estimation is incorrect so that the program number of the IN token is insufficient for the firmware process, the eight bytes data (P11) is not returned which should have to be returned, and then the test pattern enters into the nest step.

In Japanese laid-open patent publication No. 61-212137, there is disclosed another known technique as the other conventional. USB function evaluator for solving the above described first problem wherein a looped transmission system having a polling interval adjustment means for adjusting the polling interval in accordance with the number of the received cast data FIG. 5 is a diagram illustrative of a transmission timing of the known technique looped transmission system having the polling interval adjustment means. One packet comprises a flag-code (F), address (A), commend (C), frame-check code (FCS), and termination code (GA). The polling interval is changed or adjusted in accordance with the number of texts of the received text data for the purpose of relaxation of increase of traffic and ensure the necessary time for processing the received data.

FIG. 6 is a block diagram illustrative of the polling interval adjusting circuit provided in the looped transmission system. The polling interval adjusting circuit has a receiving shift register 201 for performing serial/parallel conversions of the received data. The polling interval adjusting circuit also has a flag detector circuit 203 being connected to the receiving shift register 201 for detecting the flag code (F). The polling interval adjusting circuit also has a GA detector circuit 202 being connected to the receiving shift register 201 for detecting the termination code (GA). The polling interval adjusting circuit also has an up-down counter 206 being connected to the flag detector circuit 203. As shown in FIG. 5, if one packet has plural number of the test data, the same number of the flag codes are present. The flag code detector circuit 203 detects the plural number "n" of the flag code (F) to count-up by n-times the up-down counter 206. The polling interval adjusting circuit also has a first latch circuit 204 connected to the GA detector circuit 202. The end of the packet is detected by the GA detector circuit 202 and then the packet is held in the first latch circuit 204. An oscillator 205 is provided for supplying a clock. A first logic gate 211 is provided which has two inputs connected to the first latch circuit 204 and the oscillator 205 and a single output connected to the up-down counter 206. A second latch circuit 207 is provided. A second logic gate 212 is also provided which has two inputs connected to the first latch circuit 204 and the up-down counter 206 and a single output connected to the second latch circuit 207. During when the first latch circuit 204 holds the packet, the first and second logic gates 211 and 212 are placed in open state, whereby the up-down counter 206 already counted up is then subjected to a count down by a clock (period T2) which has been supplied from the oscillator 205 through the first logic gate 211. At counting "0", the up-down counter 206 outputs a carry which is then transmitted through the second logic gate 212 to the second latch circuit 207, whereby the carry is then held by the second latch circuit 207. Upon output of the carry from the up-down counter 206, the first and second logic gates 211 and 212 are placed into close state. An output delay circuit 208 is also provided which is connected to the second latch circuit 207 for receiving the output of carry from the second latch circuit 207 and delaying the transmission timing of the output from the second latch circuit 207 with a predetermined delay time "T1". A polling generator 209 is further provided which is connected to the delay circuit 208 for receiving the output from the output delay circuit 208 at a delayed timing, so that the polling generator 209 is thus started with a time interval (T1+nT2) from the end of the packet.

If the polling interval adjusting circuit is applied to the USB function evaluator, then it is possible to capture the return packet from the USB function for detecting the end of the received data, whereby automatically the next token may be transmitted without confliction to the returned packet and independently from the length of the returned data. As a result, the above described first problem could be solved, whilst the above described second problem could not be solved because it is necessary to judge whether the returned packet is NAK or data STALL type for plural times of the IN token transmissions. Namely, the above other conventional technique dislocated in the above Japanese publication further needs a further function for judging the kinds of the received packets for controlling the poling generator in accordance with the kind of the packet. Namely, the above other conventional technique dislocated in the above Japanese publication is incapable of solving the above described second problem.

Considering how to solve the second problem, it is difficult to estimate the necessary time for the F/W processes of the USB function. For this reason, it is necessary to optionally set a provisional idol time, otherwise to optionally set the number of IN token so that the test pattern is once executed to the USB function and then the return timing from the USB function is fed back to the above test pattern for correcting the same. Namely, two times executions of each test pattern are necessary. This means that a tremendously long time is taken to prepare the test patterns and subsequent evaluations using the same. Further, if the test pattern once prepared is used for other evaluation to the other USB function, then it is necessary to correct the test pattern because of difference in F/W processing time due to difference of CPU performance and application.

In the above circumstances, it had been required to develop a novel method and system for evaluating USB function free from the above problem.

SUMMARY OF THE INVENTION

Accordingly, it is an object of the present invention to provide a novel system for evaluating the USB function free from the above problems.

It is a further object of the present invention to provide a novel USB function evaluating system capable of evaluating the USB function within a shortened evaluation time.

It is a still further object of the present invention to provide a novel USB function evaluating system capable of evaluating the USB function for allowing a reduction in the necessary time for preparing the test patters and also another reduction in the necessary time for evaluating the USB function.

It is yet a further object of the present invention to provide a novel USB function evaluating system capable of evaluating the USB function for allowing once prepared test pattern for one USB function to be used to evaluate the other USB function without any correction to the test pattern.

It is another object of the present invention to provide a novel method for evaluating the USB function free from the above problems.

It is still another object of the present invention to provide a novel method for evaluating the USB function within a shortened evaluation time.

It is yet another object of the present invention to provide a novel method for evaluating the USB function for allowing a reduction in the necessary time for preparing the test patters and also another reduction in the necessary time for evaluating the USB function.

It is further another object of the present invention to provide a novel method for evaluating the USB function for allowing once prepared test pattern for one USB function to be used to evaluate the other USB function without any correction to the test patter.

The present invention provides a universal serial bus function evaluator connected between a computer and an universal serial bus function. The universal serial bus function evaluator comprises a token storage memory for storing a token transmitted from the computer; a packet type judging circuit for judging a type of a return data packet returned from the universal serial bus function; and a functional circuit connected to the token storage memory for fetching IN token from the token storage memory and holding the same, and the functional circuit also being connected to the packet type judging circuit for receiving an information about the type of the return data packet from the packet type judging circuit, so that if the return data packet is of NAK type, then the functional circuit transmits the IN token held therein to the universal serial bus function, and if the return data packet is of either DATA type or STALL type, then the function a circuit cancels the held IN token.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
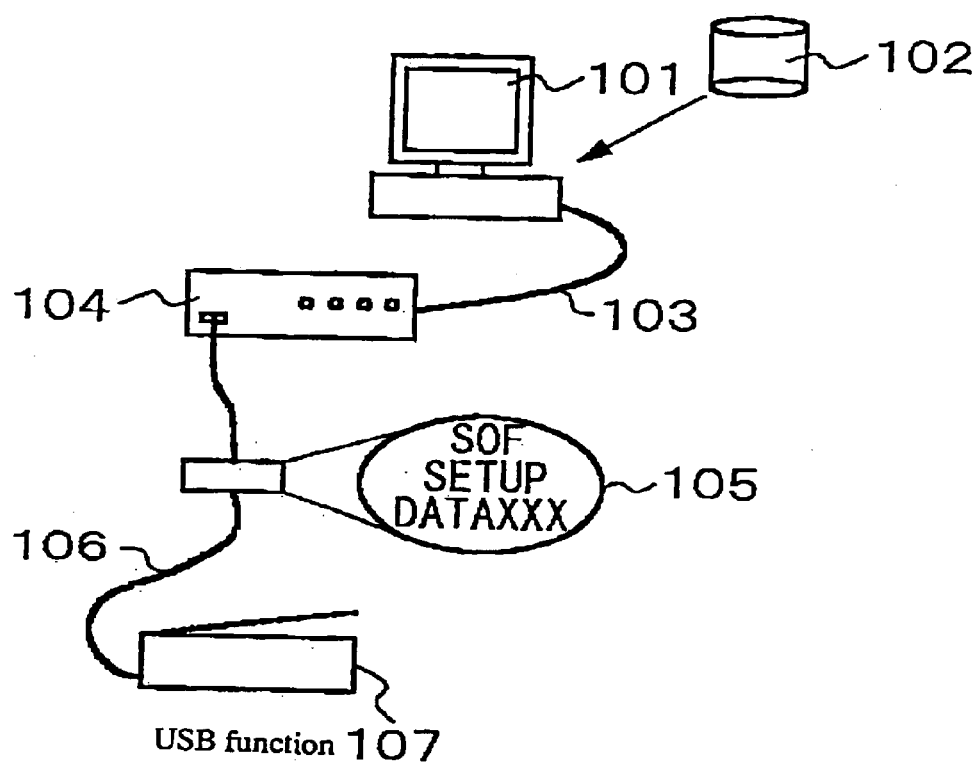
FIG. 1 is a schematic view illustrative of a conventional system of evaluating function of universal serial buses as peripheral devices of personal computer, for example, printer and scanner.
Figure 2:
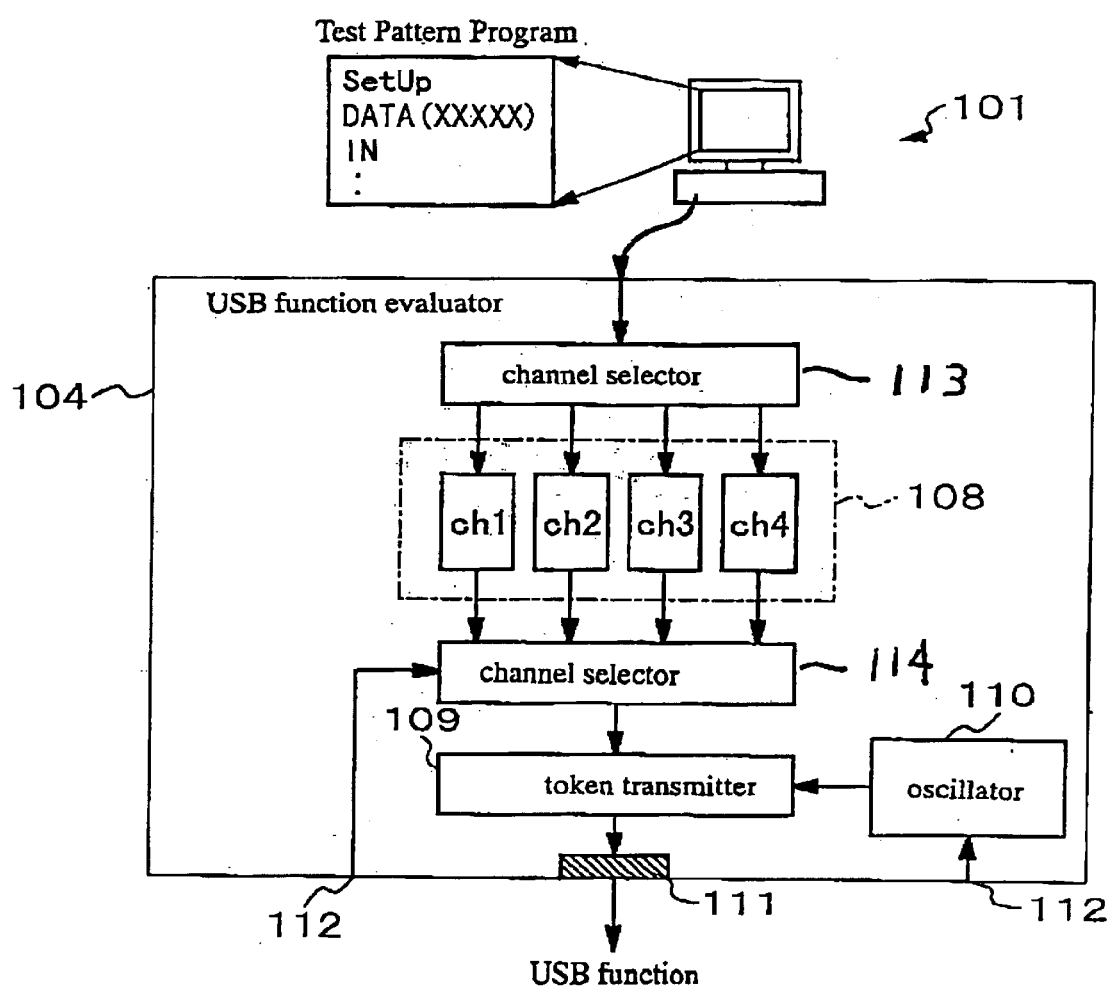
FIG. 2 is a block diagram illustrative of an internal configuration of the USB function evaluator in the conventional system of FIG. 1.
Figure 3:
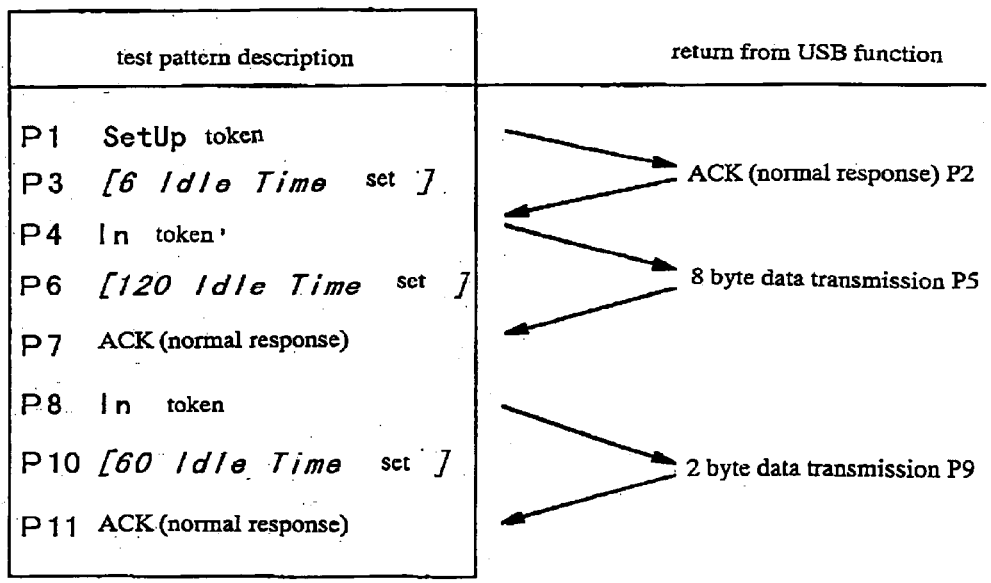
FIG. 3 is a diagram illustrative of the above described first problem engaged with the conventional system.

The first present invention provides a universal serial bus function evaluator connected between a computer and an universal serial bus function. The universal serial bus function evaluator comprises: a token storage memory for storing a token transmitted from the computer; a packet type judging circuit for judging a type of a return data packet returned from the universal serial bus function; and a functional circuit connected to the token storage memory for fetching IN token from the token storage memory and holding the same, and the functional circuit also being connected to the packet type judging circuit for receiving an information about the type of the return data packet from the packet type judging circuit, so that if the return data packet is of NAK type, then the functional circuit transmits the IN token held therein to the universal serial bus function, and if the return data packet is of either DATA type or STALL type, then the functional circuit cancels the held IN token.

It is preferable that the functional circuit comprises an oscillator for generating a clock signal; an IN token holding circuit connected to the oscillator for receiving the clock signal and also connected to the token storage memory for fetching IN token from the token storage memory and holding the same; and a timing controller connected to the oscillator for receiving the clock signal and also connected to the packet type judging circuit for receiving an information about the type of the return data packet, and the timing controller also connected to the IN token holding circuit for controlling the IN token holding circuit both in a holding timing for holding the IN token and in a transmitting timing for transmitting the IN token to the universal serial bus function.

It is further preferable that the functional circuit further comprises: an EOP detecting circuit connected to the universal serial bus function for receiving the return packet to detect a packet end of the return packet, and the EOP detecting circuit also connected to the timing controller for sending an EPO detecting signal which represents the packet end to the timing controller.

A It is also preferable that if the return data packet is of DATA type, then the functional circuit not only cancels the held IN token but also transmits ACK token.

It is further preferable that the functional circuit comprises: an oscillator for generating a clock signal; an IN token holding circuit connected to the oscillator for receiving the clock signal and also connected to the token storage memory for fetching IN token from the token storage memory and holding the same; an ACK token transmission circuit connected to the oscillator for receiving the clock signal; and a timing controller connected to the oscillator for receiving the clock signal and also connected to the packet type judging circuit for receiving an information about the type of the return data packet, and the timing controller also connected to the IN token holding circuit for controlling the IN token holding circuit both in a holding timing for holding the IN token and in a transmitting timing for transmitting the IN token to the universal serial bus function, so that if the return data packet is of DATA type, then the timing controller allows the ACK token transmission circuit to transmit an ACK token to the universal serial bus function.

The second present invention provides a universal serial bus function evaluator connected between a computer and an universal serial bus function. The universal serial bus function evaluator comprises: a token storage memory for storing a token transmitted from the computer; a token transmission circuit connected to the token storage memory for transmitting a token stored in the token storage memory; an IN token detecting circuit connected to the token transmission circuit; an oscillator for generating a clock signal; an IN token holding circuit connected to the oscillator for receiving the clock signal and also connected to the token transmission circuit for receiving an IN token from the token transmission circuit and holding the same; a receiving shift register being connected to a universal serial bus function for receiving a return packet from the universal serial bus function; a packet type judging circuit connected to the receiving shift register for receiving the return packet and judging a type of the return packet; an EOP detecting circuit connected to the universal serial bus function for receiving the return packet to detect a packet end of the return packet; a timing controller connected to the oscillator for receiving the clock signal and also connected to the FOP detecting circuit for receiving an EOP detecting signal which represents the packet end of the return packet, the timing controller also connected to the packet type judging circuit for receiving an information about the type of the return packet, and the timing controller also connected to the IN token holding circuit for controlling the IN token holding circuit both in a holding timing for holding the IN token and in a transmitting timing for transmitting the IN token to the universal serial bus function, so that if the return packet is of NAK type and the timing controller receives both the return packet of NAK type and the EOP detecting signal, then the timing controller allows the IN token holding circuit to transmit the IN token held therein to the universal serial bus function, and if the return data packet is of either DATA type or STALL type, then the timing controller instructs the IN token holding circuit to hold the IN token therein It is preferable to further comprise an ACK token transmission circuit connected to the oscillator for receiving the clock signal, and if the return packet is of DATA type, then the timing controller allows the ACK token transmission circuit to transmit an ACK token to the universal serial bus function.

PREFERRED EMBODIMENT
First Embodiment

Figure 7:
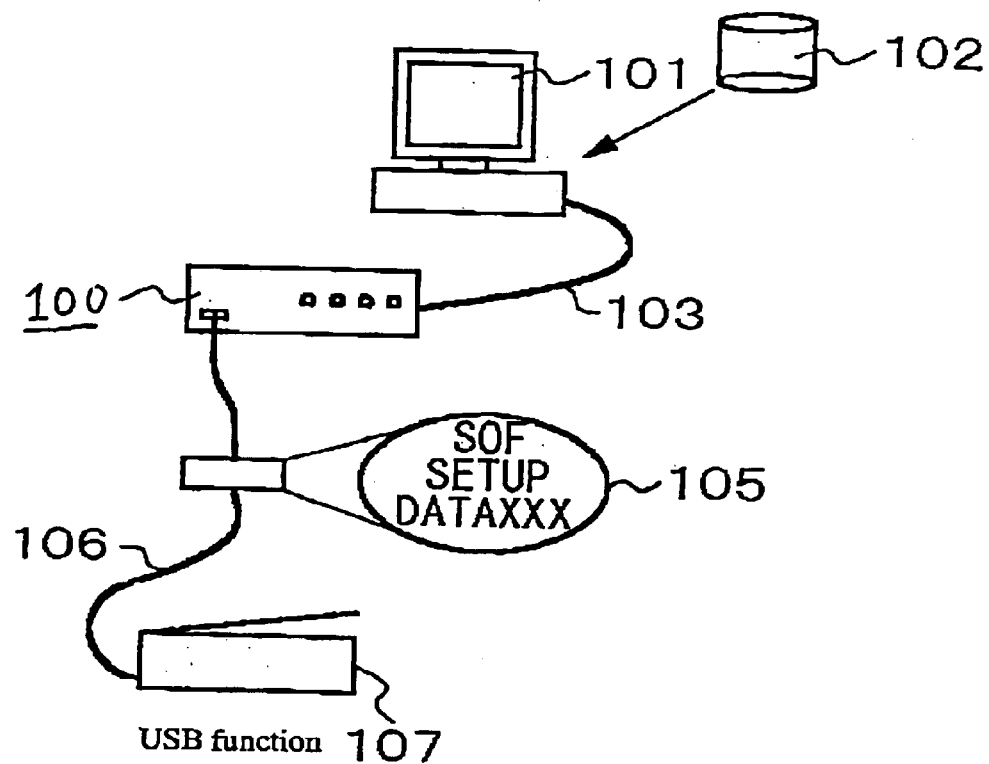
FIG. 7 is a schematic view illustrative of a system of evaluating the USB function by the improved USB function evaluator.

A first embodiment according to the present invention will be described in detail with reference to the drawings. The improvement by the present invention is in the USB function evaluator. FIG. 7 is a schematic view illustrative of a system of evaluating the USB function by the improved USB function evaluator. The system has a computer 101 for controlling an USB function evaluator in accordance with an evaluation test pattern programming software 102. The computer 101 performs conversion to binary data to generate token in accordance with the evaluation test pattern programming software 102. The system also has a parallel or serial port 113 and an improved USB function evaluator 100 which is connected through the parallel or serial port 113 to the computer 101. The token generated by the computer 101 is transferred through the parallel or serial port 113 to the improved USB function evaluator 100 for storing the token into the improved USB function evaluator 100. The system also has an USB cable 106, an USB protocol monitor 105 and an USB function 107. The computer 101 is connected through the USB cable 106 to the USB function 107, wherein the USB protocol monitor 105 is provided on an intermediate point of the USB cable 106 for monitoring packets on the USB cable 106. Upon tuning a start switch ON of the improved USB function evaluator 100, the token is transmitted from the improved USB function evaluator 100 through the USB cable 106 to the USB function 107, during which the USB protocol monitor 105 provided on the USB cable 106 monitors packets on the USB cable 106 for allowing the improved USB function evaluator 100 to evaluate the USB function 107.

Figure 8:
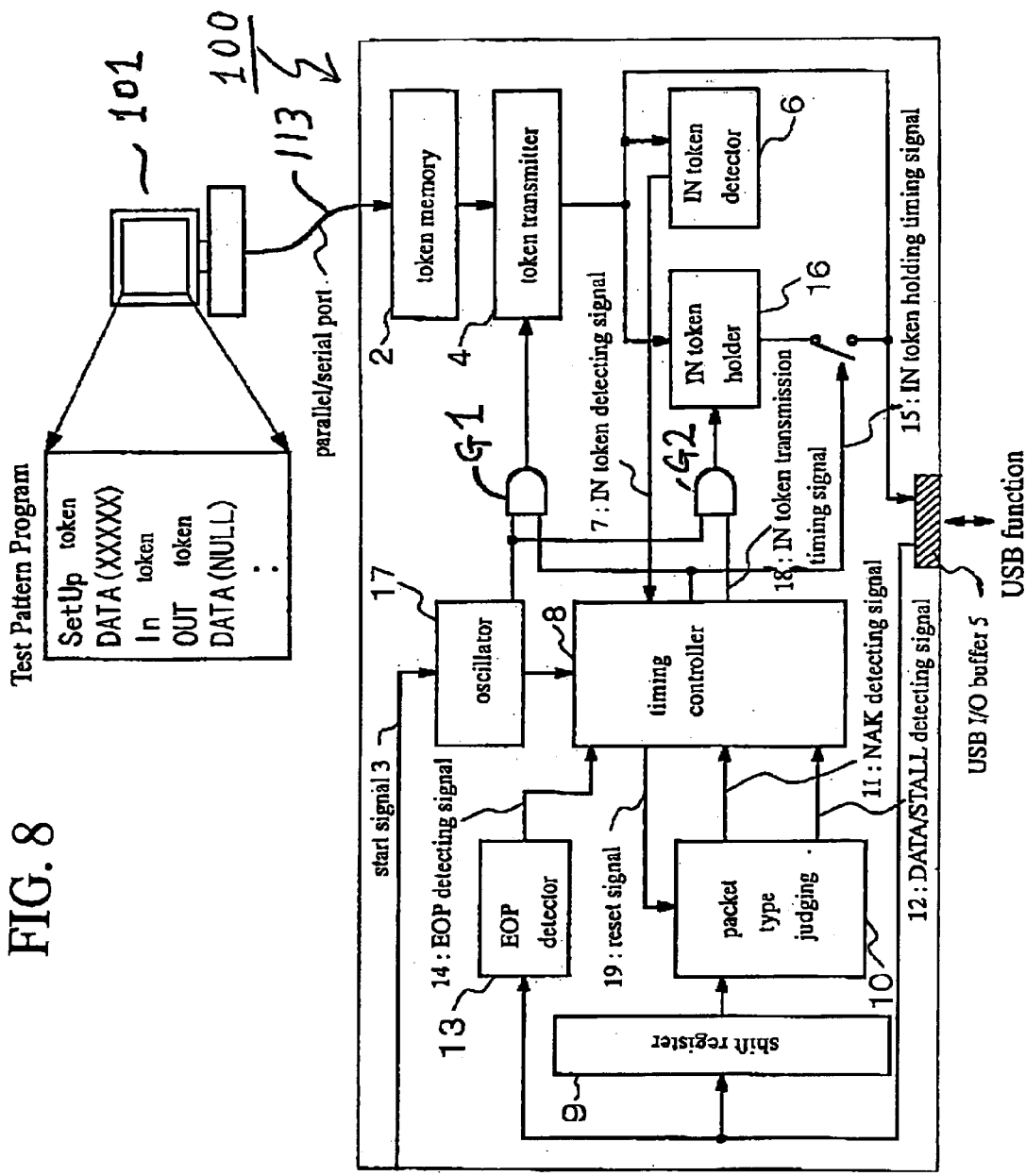
FIG. 8 is a block diagram illustrative of an internal configuration of the novel USB function evaluator in the system of FIG. 7 in the first embodiment in accordance with the present invention.

FIG. 8 is a block diagram illustrative of an internal configuration of the novel USB function evaluator in the system of FIG. 7 in the first embodiment in accordance with the present invention. The USB function evaluator 100 has the following circuit configuration. A token storage memory 2 is provided which is connected through the parallel or serial port 113 to the computer 101 for receiving the token from the computer 101 and storing the token therein. A token transmitter circuit 4 is provided which is connected to the token storage memory 2. An oscillator 17 is provided for generating a clock upon input of a start signal 3. A timing controller 8 is also provided which is connected to the oscillator 17 for receiving the clock from the oscillator 17. A first logic gate G1 is provided which has two inputs connected to the oscillator 17 and the timing controller 8 and a single output connected to the token transmitter circuit 4. An IN token detecting circuit 6 is further provided which has an input terminal connected to the token transmitter circuit 4 and an output terminal connected to the timing controller 8. Upon input of the start signal 3, the oscillator 17 generates the clock which is then transmitted through the first logic gate G1 to the token transmitter circuit 4, whereby the token transmitter circuit 4 fetches the token from the token storage memory 2 and outputs the token. If the token outputted from the token transmitter circuit 4 is of the IN type token, then the IN token detecting circuit 6 detects the IN token and sends the timing controller 8 a notice to the effect that the token is of the IN token. An IN token holder circuit 16 is further provided which is connected to the token transmitter circuit 4. A second logic gate 02 is also provided which has two inputs connected to the oscillator 17 and the timing controller 8 and a single output connected to the IN token holder circuit 16. The above described first logic gate G1 receives the lock signal from the oscillator 17 and also receives an IN token transmission timing signal 18 from the timing controller 8 so that the IN token transmission timing signal 18 is transmitted to the token transmitter circuit 4 for transmitting the token. The token transmitter circuit 4 is also connected to an USB I/O buffer 5 which is further connected to the USB function. The IN token is also transmitted from the token transmitter circuit 4 to the IN token detecting circuit 6 so that the IN token detecting circuit 6 then sends the timing controller 8 the notice to the effect that the token transmitted from the token transmitter circuit 4 is the IN token, whereby the timing controller 8 outputs an IN token holding timing signal 15 which is then transmitted to the first logic gate G1 to discontinue the transmission of the token from the token transmitter circuit 4 to the IN token holder circuit 16 and also to disconnect the IN token holder circuit 16 from the USB I/O buffer 5 for allowing the IN token holder circuit 16 holds the IN token. If the timing controller 8 receives both the NAK detecting signal 11 and the EOP detecting signal 14, then the timing controller 8 scuds the In token transmission timing signal 18 to one input of the second logic gate G2. Since another input of the second logic gate G2 receives the clock signal from the oscillator 17, then the clock signal is transmitted to the In token holding circuit 16. Upon receipt of the clock signal from the oscillator 17, the IN token holder circuit 16 transmits the IN token which is then transmitted through the USB 110 buffer 5 to the USB function. The USB function then returns a return packet to the USB I/O buffer 5. A receiving shift register 9 is also provided which is connected to the USB I/O buffer 5 for receiving the return packet through the USB I/O buffer 5 from the USB function. A packet termination of the return packets from the USB function will hereinafter be referred to as "EOP". An EOP-detecting circuit 13 is also provided which has an input terminal connected to the USB I/O buffer 5 for detecting the packet termination of the return packets from the USB function and an output terminal connected to the timing controller 8 for sending the timing controller 8 an EOP-detected signal 14 in order to inform the timing controller 8 of the packet termination of the return packets from the USB function. A packet type judging circuit 10 is further provided which is connected to the receiving shift register 9 for judging the kind of the return packet. The return packet from the USB function is transmitted through the USB I/O buffer 5 to the receiving shift register 9, whereby the receiving shift register 9 performs the serial/parallel conversion to the received packet, before the packet type judging circuit 10 receives the serial/parallel-converted packet from the receiving shift register 9, so that the packet type judging circuit 10 judges the packet type. If the packet type judging circuit 10 judges the packet to be of NAK type, then the packet type judging circuit 10 generates an NAK detecting signal 11 which is transmitted to the timing controller 8. If the packet type judging circuit 10 judges the packet to be of DATA type or STALL type, then the packet type judging circuit 10 generates a DATA-STALL detecting signal 12 which is also transmitted to the timing controller 8.

If the IN token detecting circuit 6 detects the IN token, then the IN token detecting circuit 6 sends the timing controller 8 the IN token detecting signal 7. If the timing controller 8 receives the IN token detecting signal 7 from the IN token detecting circuit 6, then the timing controller 8 activates the IN token holding timing signal 15, so that the IN token holding circuit 16 holds the IN token transmitted from the token transmitter circuit 4. Meanwhile, the activated IN token holding timing signal 15 is transmitted to one input of the first logic gate G1. Since the other input of the first logic gate also receives the clock signal from the oscillator 17, the transmission of the clock signal from the oscillator 17 to the token transmitter circuit 4 is discontinued.

If the timing controller 8 receives the NAK detecting signal 11 from the packet type judging circuit 10 and also receives the EOP detecting signal 14 from the EOP detecting circuit 13, then the timing controller 8 activates the IN token transmission timing signal 18 which is then transmitted to the one input of the second logic gate G2. Since the other input of the second logic gate G2 also receives the clock signal from the oscillator 17, then the second logic gate G2 allows the transmission of the clock signal from thee oscillator 17 to the IN token holding circuit 16, whereby the IN token holding circuit 16 transmits the held IN token through the USB I/O buffer 5 to the USB function.

Figure 9:
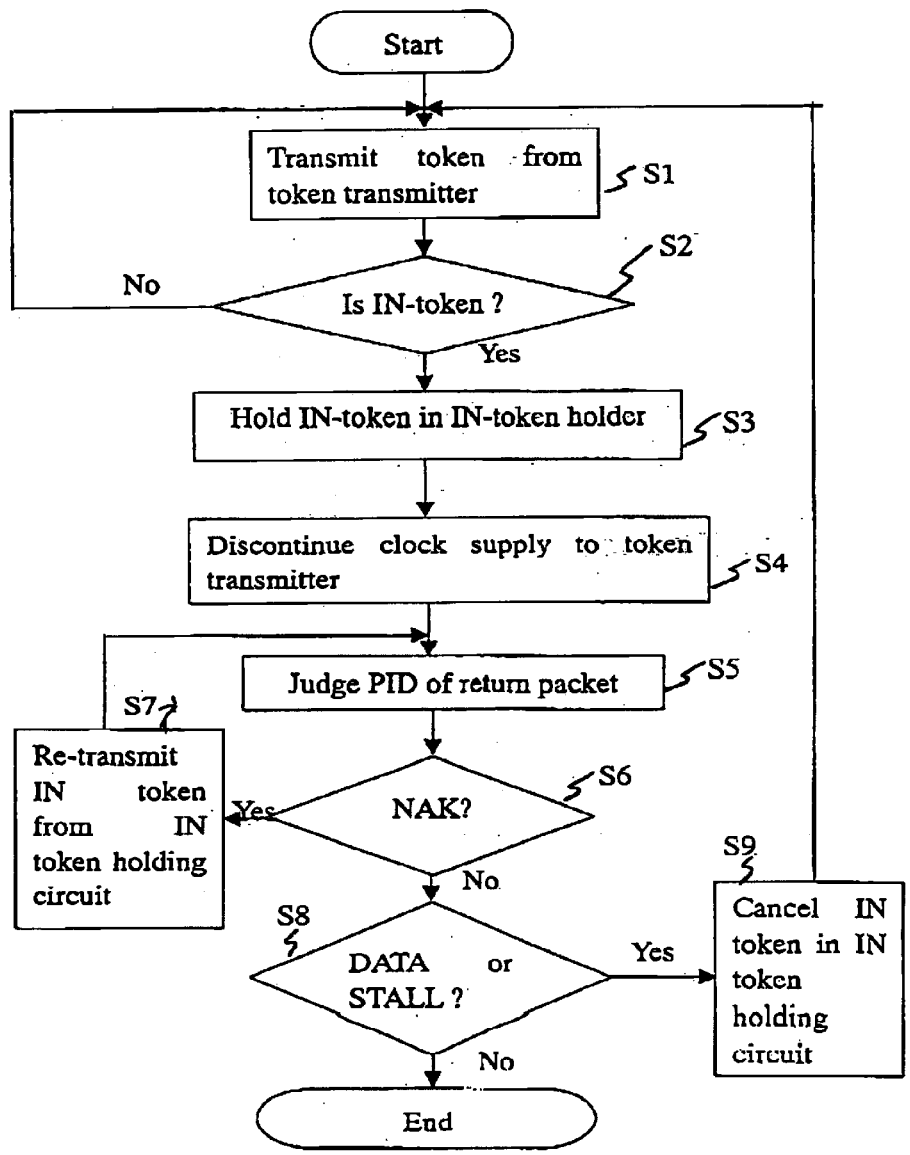
FIG. 9 is a flow chart illustrative of a novel method of evaluation of the USB function by the novel USB function evaluator of FIG. 8.
Figure 10:
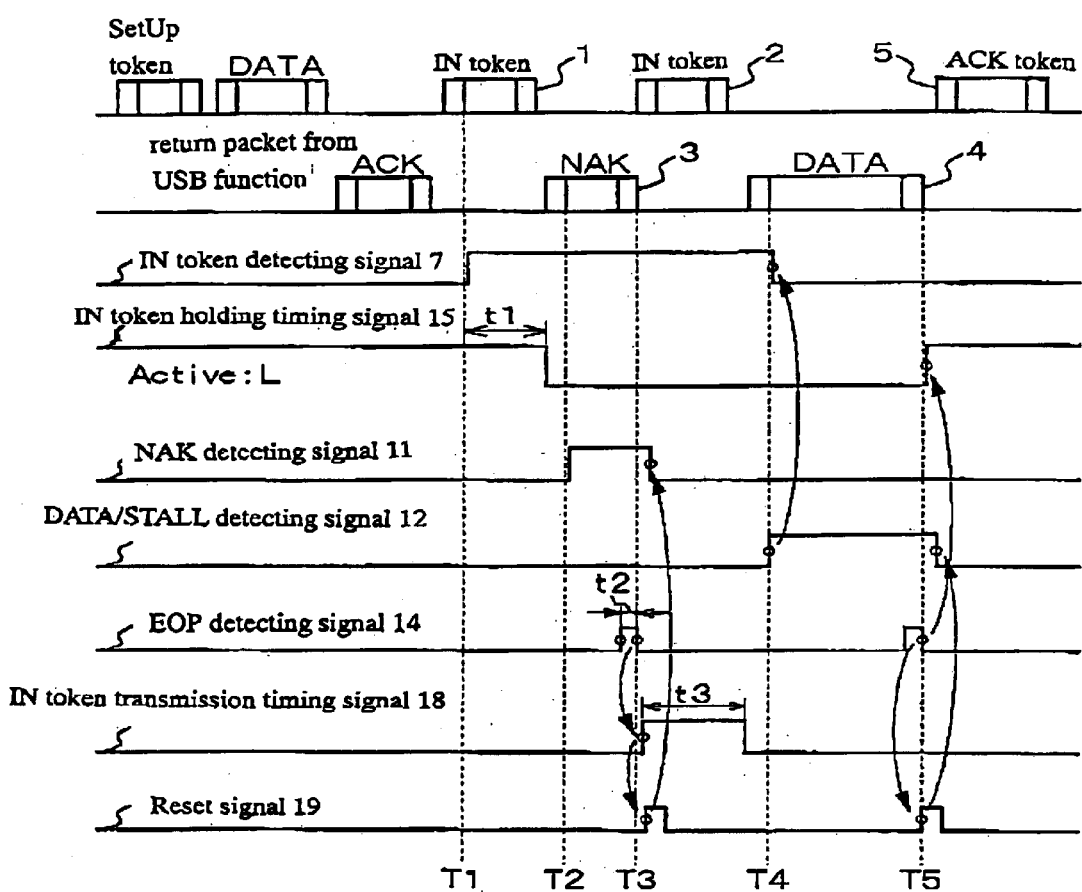
FIG. 10 is a timing chart illustrative of individual signals transmitted in the novel USB function evaluator of FIG. 8 to explain operations thereof.
Figure 11:
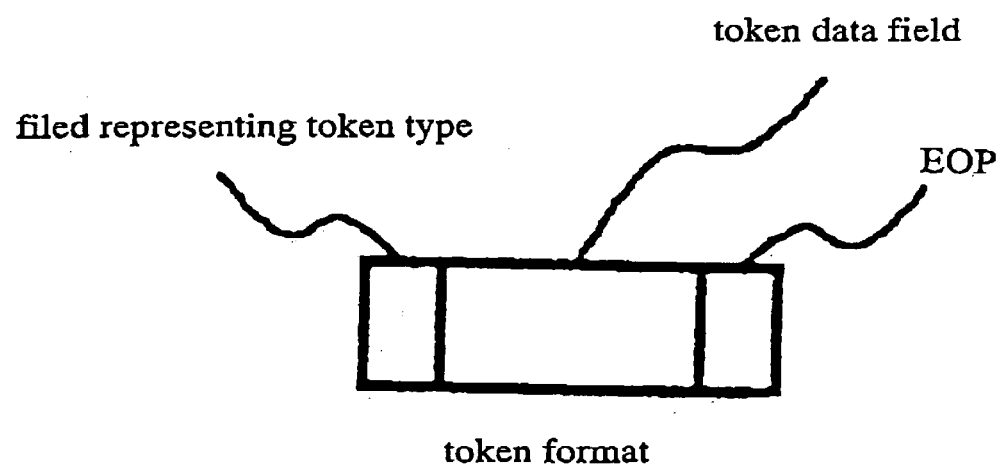
FIG. 11 is a diagram illustrative of a format of the token.

FIG. 9 is a flow chart illustrative of a novel method of evaluation of the USB function by the novel USB function evaluator of FIG. 8. FIG. 10 is a timing chart illustrative of individual signals transmitted in the novel USB function evaluator of FIG. 8 to explain operations thereof. FIG. 11 is a diagram illustrative of a format of the token.

In a step S1, upon input of the start signal 3 into the oscillator 17, the clock signal is transmitted from the oscillator 17 through the first logic gate G1 to the token transmitter circuit 4, so that the token transmitter circuit 4 fetches the token from the token storage memory 2 and transmits the token to the IN token detecting circuit 6 and also to the IN token holding circuit 16. As shown in FIG. 1, the token has a format which comprises a PID field of head 8 bits which identifies he token type, a token data field at an intermediate position and an EOP at its bottom position.

In a step S2, if the IN token detecting circuit 6 detects that the code of the PID field of the token identifies the IN token type, then the IN token detecting circuit 6 activates the IN token detection signal 7 at a timing "T1 shown in FIG. 10.

After a data field time period "t1" of the IN token from the above timing T1 of having activated the IN token detecting signal 7 has passed, the timing controller 8 activates the IN token holding timing signal 15, whereby the output of the IN token holding circuit 16 is made connected to the USB I/O buffer 5, whilst the transmission of the clock signal from the oscillator 17 to the IN token holding circuit 16 is discontinued.

In a step S4, further, the activated IN token holding timing signal 15 is transmitted to the first logic gate G1, whereby the first logic gate G1 discontinue the transmission of the clock signal from the oscillator 17 to the token transmitter circuit 4. At this time, as shown in FIG. 10, the IN token 1 detected at the timing "T1" has already been transmitted through the USB I/O buffer 5 to the USB function and further the NAK packet 3 has already been returned from the USB function as the return packet to the IN token 1.

In a step S5, the NAK packet 3 as the return packet to the IN token is then transmitted through the USB I/O buffer 5 to the receiving shift register 9, wherein the NAK packet 3 is subjected to the serial/parallel conversion by the receiving shift register 9. The NAK packet is then transmitted to the packet type judging circuit 10, so that the packet type judging circuit 10 detects the IPD field of the packet.

In a step S6, if the packet type judging circuit 10 detects the NAK type of the packet, then the packet type judging circuit 10 activates the NAK detecting signal 11 at a timing "I" shown in FIG. 10.

The NAK packet as the return packet from the USB function is also transmitted through the USB I/O buffer 5 to the EOP detecting circuit 13, whereby the EOP detect circuit 13 activates the EOP detecting signal 14 only in a time period "t2" which corresponds to the EOP time period of the NAK packet 3. As shown in FIG. 10, at a timing "v", the time period "t2" is ended whereby the EOP detecting signal 14 is inactivated whilst the NAK detecting signal 11 remains active. At this timing "T3", the timing controller 8 activates the IN token transmission timing signal 18, wherein the IN token transmission timing signal 18 is continued activate in a time period "t3" which corresponds to the packet length of the IN token.

In a step S7, at the timing when the IN token transmission timing signal 18 is activated, then the timing controller 8 activates the reset signal 19 which is transmitted to the packet type judging circuit 10, whereby the packet type judging circuit 10 makes the activated NAK detecting signal 11 into the inactive state. The timing control circuit 8 transmits the IN token transmission signal 18 to the second logic gate G2 so that the second logic gate G2 allows the transmission of the clock signal from the oscillator 17 to the IN token holding circuit 16 in a time period "t3", whereby the IN token 2 shown in FIG. 10 is transmitted. In the above step S6, if the return packet to the IN token 2 from the USB function is judged to be DATA type by the packet type judging circuit 10, then in a step S8, the packet type judging circuit 10 activates DATA/STALL detecting signal 12 at a timing "T4" shown in FIG. 4. At this timing "T4", the timing controller 8 also inactivates the. IN token detecting signal 7. If the EOP detecting circuit 13 detects the EOP of the return packet to be of the DATA packet, then the EOP detecting circuit 13 activates the EOP detecting signal 14 only in the time period "t2" which corresponds to the EOP time period. At a timing "T5", the EOP detecting signal 14 is then inactivated. At this timing "t5", the timing controller 8 inactivates the token holding timing signal 15 and also activates the reset signal 19 so that the packet type judging circuit 10 inactivates the DATA/STALL detecting signal 12.

In a step S9, since the token holding signal 15 is inactivated, the IN token holding circuit 17 is made disconnected from the USB I/O buffer 5, whereby the IN token held in the IN token holding circuit 16 is made invalid. Since the IN token holding timing signal 15 is inactivated, the clock signal is transmitted from the oscillator 17 to the token transmitter circuit 4, so that the token stored in the token storage memory 3 is again transmitted to the IN token detecting circuit 6 and the IN token holder circuit 16.

Figure 4:
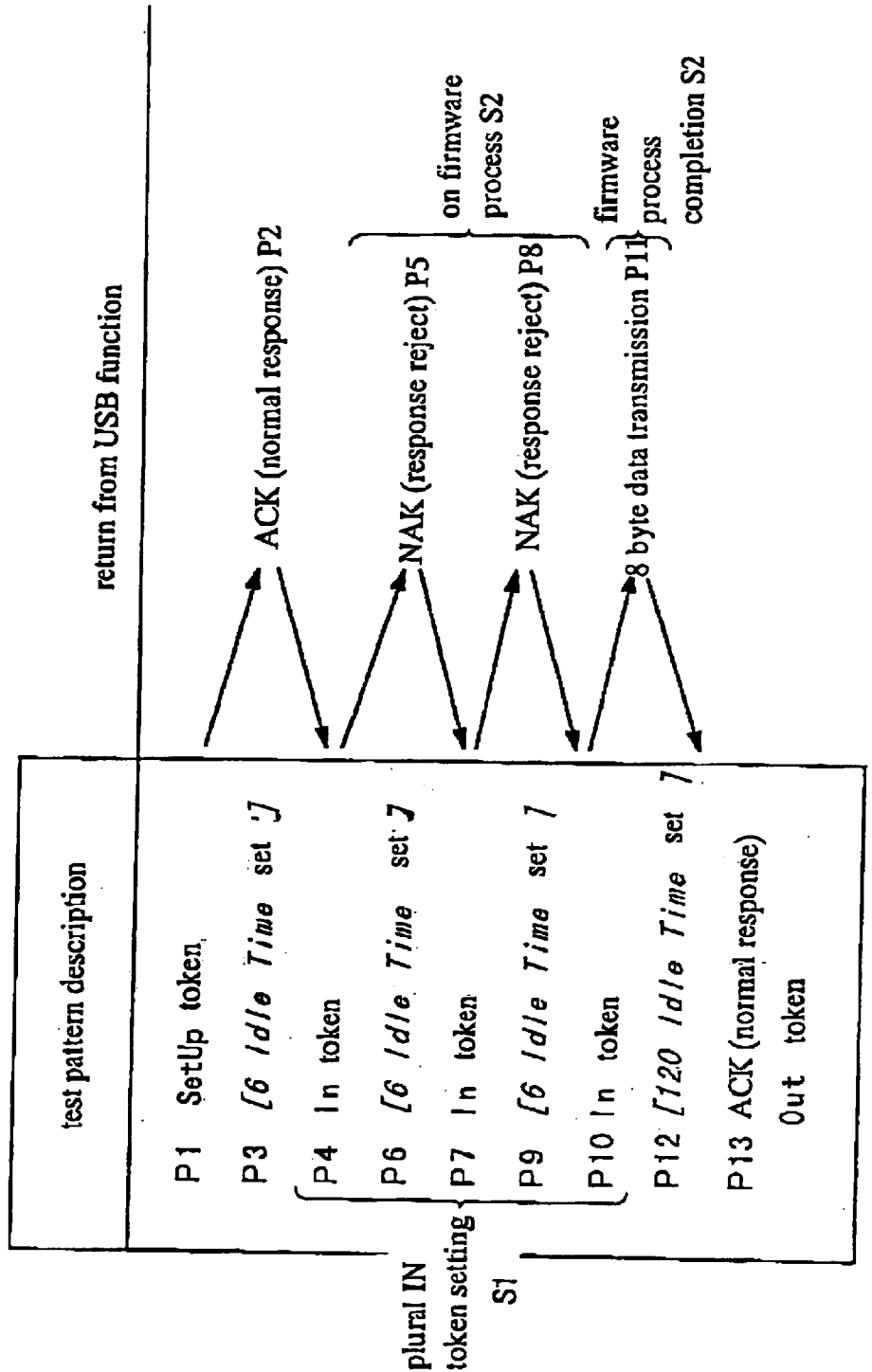
FIG. 4 is a diagram illustrative of the above-described second problem engaged with the conventional system of FIG. 1.
Figure 5:
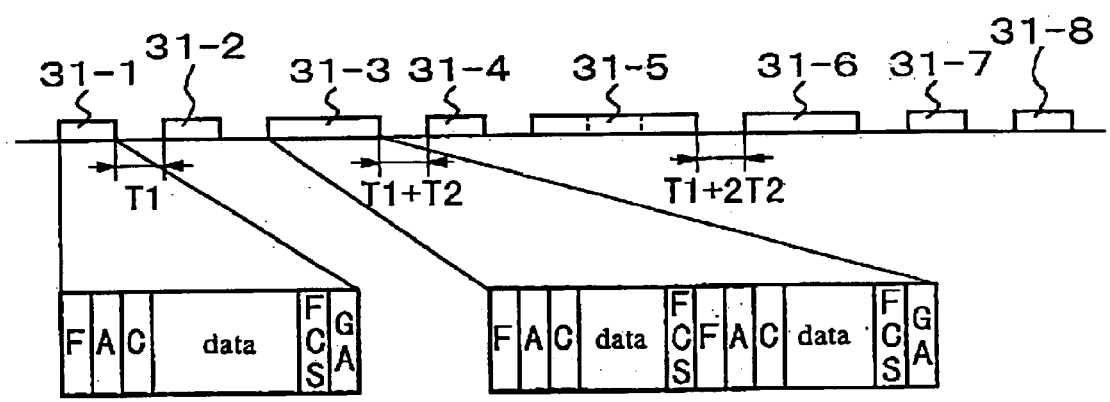
FIG. 5 is a diagram illustrative of a transmission timing of the known technique looped transmission system having the polling interval adjustment means.
Figure 6:
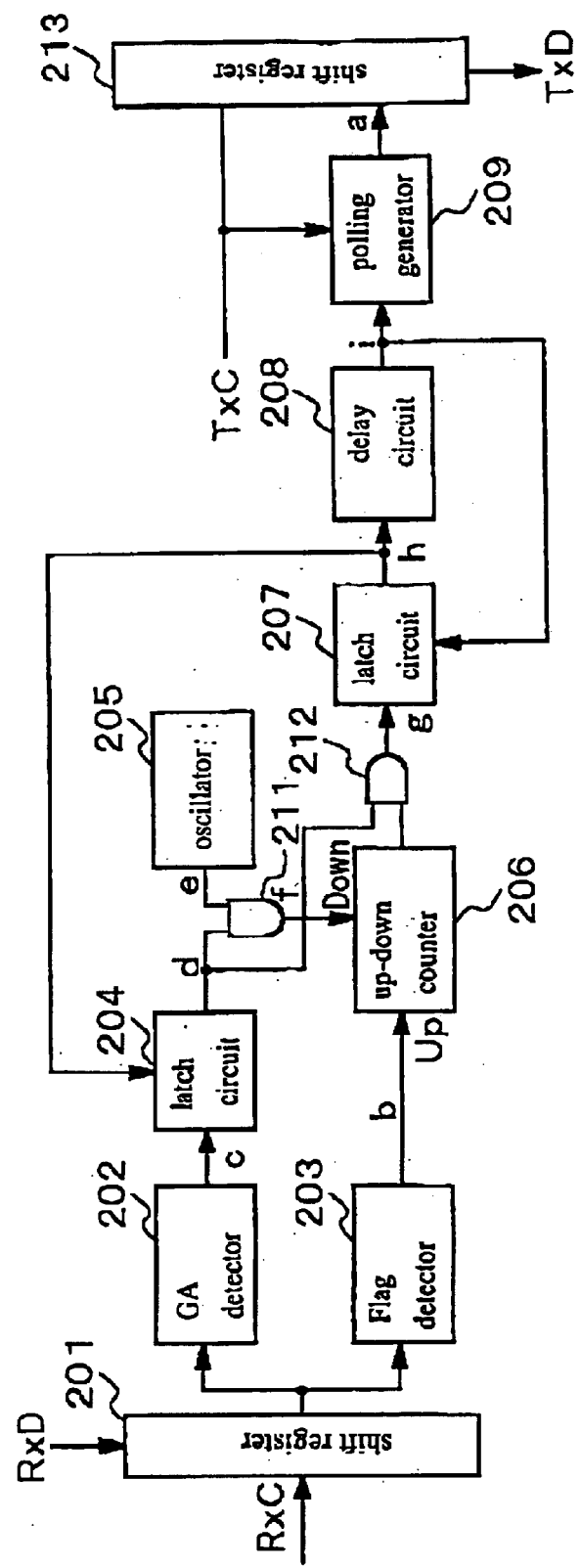
FIG. 6 is a block diagram illustrative of the polling interval adjusting circuit provided in the looped transmission system.

In the above step S6, if the return packet to the IN token 2 from the USB function is judged to be STALL type by the packet type judging circuit 10, then in the step S8, the packet type judging circuit 10 activates DATA/STALL detecting signal 12 at the timing "T4" shown in FIG. 4. At this timing "T4", the timing controller 8 also inactivates the IN token detecting signal 7. If the EOP detecting circuit 13 detects the EOP of the return packet to be of the DATA packet, then the EOP detecting circuit 13 activates the EOP detecting signal 14 only in the time period "t2" which corresponds to the EOP time period. At a timing "T5", the EOP detecting signal 14 is then inactivated. At this timing "T5", the timing controller 8 inactivates the token holding timing signal 15 and also activates the reset signal 19 so that the packet type judging circuit 10 inactivates the DATA/STALL detecting signal 12.

In the step S9, since the token holding signal 15 is inactivated, the IN token holding circuit 17 is made disconnected from the USB I/O buffer 5, whereby the IN token held in the IN token holding circuit 16 is made invalid. Since the IN token holding timing signal 15 is inactivated, the clock signal is transmitted from the oscillator 17 to the token transmitter circuit 4, so that the token stored in the token storage memory 3 is again transmitted to the IN token detecting circuit 6 and the IN token holder circuit 16.

In the above-described embodiment, an ACK token 5 is described in the test pattern as the normal response token to the DATA packet 4 shown in FIG. 10 in accordance with the provision of USB protocol. Depending upon the USB function, the returned packet may be STALL packet but not the DATA packet 4. In this case, the ACK token 5 is unnecessary in accordance with the USB protocol.

The above novel system and method for evaluating the USB function provide the following advantages.

As to the first advantage, a single IN token programming results in that until the USB function has been prepared to return the DATA packet, transmission of IN token is automatically repeated so as to automatically detect the return packet for subsequent transmission of the next token. As a result, it is possible to do programming of token to be supplied to the USB function to the USB function evaluator without consideration about the necessary time for allowing the USB function to have prepared to return the DATA packet.

As to the second advantage, the kind of the return packet from the USB function is automatically detected to judge the re-transmission of the IN token or the next IN token and detects the EOP of the return packet for realizing the automatic transmission of the next IN token. It is, therefore, possible to do programming of token to be supplied to the USB function to the USB function evaluator without setting the IN token transmission timing to the USB function depending on the kind and length of the return packet returned from the USB function against the IN token.

In accordance with the USB protocol, the kinds of the return packet from the USB function may include DATA type, NAK type, STALL type and ACK type. The ACK type is to give a notice to the effect that the USB function normally received the tokens and data from the host computer, wherein in accordance with the USB protocol, the return timing from the USB function is provided. Since the F/W process by the USB function causes no variation in the return liming, it is possible to set a constant idling timing for preparing the test pattern. It is unnecessary that the packet judging circuit judges the packet type.

As results of the above first and second advantages, only the single test pattern preparation is necessary for realizing the effective and efficient evaluation to the USB functions.

Second Embodiment

Figure 12:
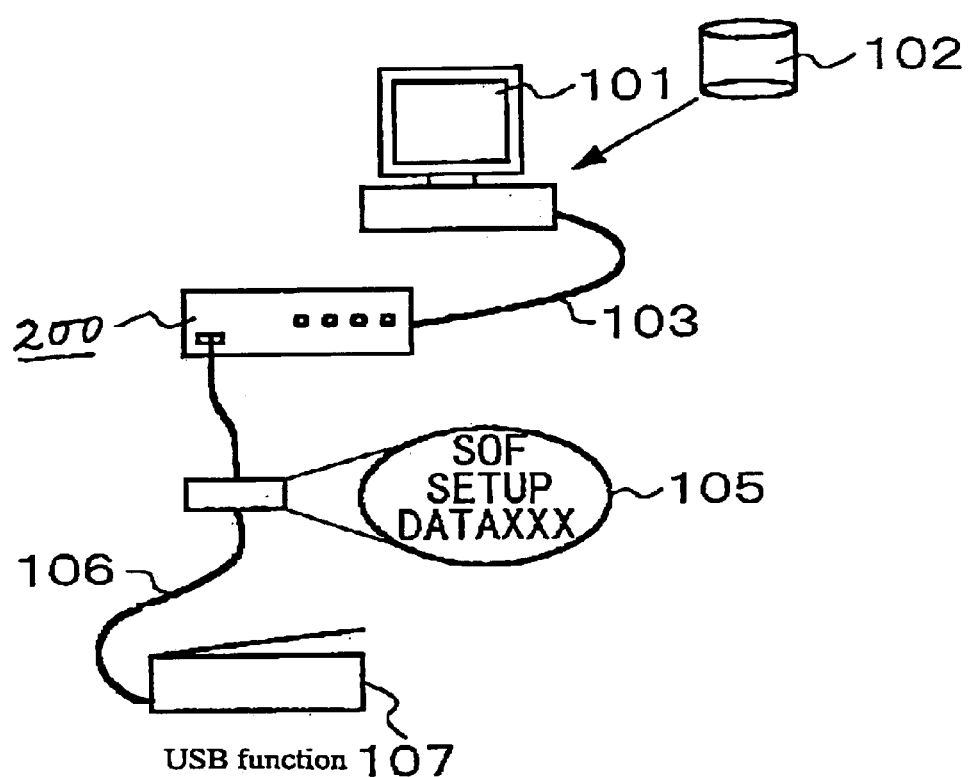
FIG. 12 is a schematic view illustrative of a system of evaluating the USB function by the improved USB function evaluator.

A second embodiment according to the present invention will be described in detail with reference to the drawings. The improvement by the present invention is in the USB function evaluator FIG. 12 is a schematic view illustrative of a system of evaluating the USB function by the improved USB function evaluator. The system has a computer 101 for controlling an USB function evaluator in accordance with an evaluation test pattern programming software 102. The computer 101 performs conversion to binary data to generate token in accordance with the evaluation test pattern programming software 102. The system also has a parallel or serial port 113 and an improved USB function evaluator 200 which is connected through the parallel or serial port 113 to the computer 101. The token generated by the computer 101 is transferred through the parallel or serial port 113 to the improved USB function evaluator 200 for storing the token into the improved USB function evaluator 200. The system also has an USB cable 106, an USB protocol monitor 105 and an USB function 107. The computer 101 is connected through the USB cable 106 to the USB function 107, wherein the USB protocol monitor 105 is provided on an intermediate point of the USB cable 106 for monitoring packets on the USB cable 106. Upon tuning a start switch ON of the improved USB function evaluator 200, the token is transmitted from the improved USB function evaluator 200 through the USB cable 106 to the USB function 107, during which the USB protocol monitor 105 provided on the USB cable 106 monitors packets on the USB cable 106 for allowing the improved USB function evaluator 200 to evaluate the USB function 107.

Figure 13:
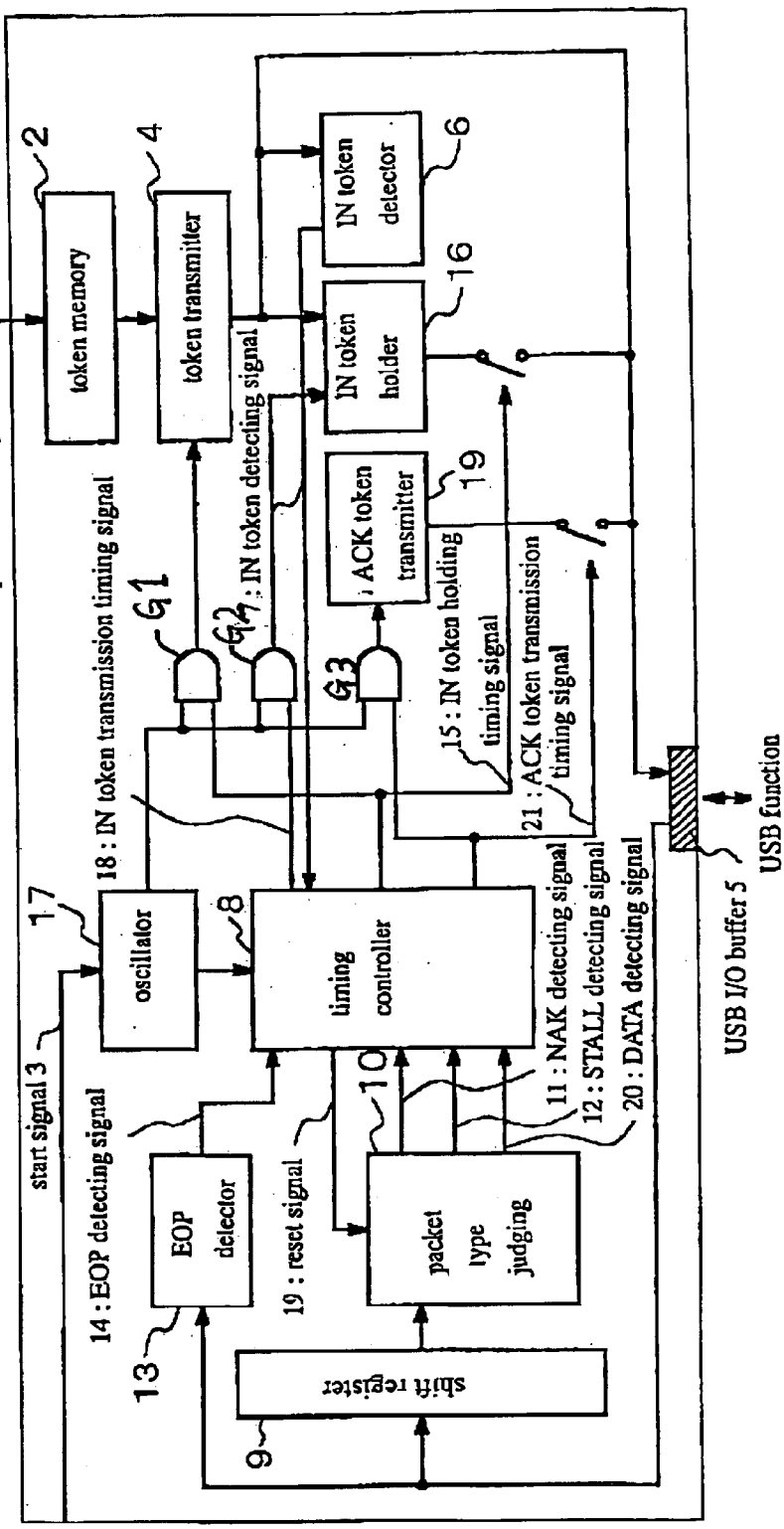
FIG. 13 is a block diagram illustrative of an internal configuration of the novel USB function evaluator in the system of FIG. 12 in the second embodiment in accordance with the present invention.

FIG. 13 is a block diagram illustrative of an internal configuration of the novel USB function evaluator in the system of FIG. 12 in the second embodiment in accordance with the present invention. The USB function evaluator 200 has the following circuit configuration. A token storage memory 2 is provided which is connected through the parallel or serial port 113 to the computer 101 for receiving the token from the computer 101 and storing the token therein. A token transmitter circuit 4 is provided which is connected to the token storage memory 2. An oscillator 17 is provided for generating a clock upon input of a start signal 3. A timing controller 8 is also provided which is connected to the oscillator 17 for receiving the clock from the oscillator 17. A first logic gate G1 is provided which has two inputs connected to the oscillator 17 and the timing controller 8 and a single output connected to the token transmitter circuit 4. An IN token detecting circuit 6 is further provided which has an input terminal connected to the token transmitter circuit 4 and an output terminal connected to the timing controller 8. Upon input of the start signal 3, the oscillator 17 generates the clock which is then transmitted through the first logic gate G1 to the token transmitter circuit 4, whereby the token transmitter circuit 4 fetches the token from the token storage memory 2 and outputs the token. If the token outputted from the token transmitter circuit 4 is of the IN type token, then the IN token detecting circuit 6 detects the IN token and sends the timing controller 8 a notice to the effect that the token is of the IN token. An IN token holder circuit 16 is further provided which is connected to the token transmitter circuit 4. A second logic gate G2 is also provided which has two inputs connected to the oscillator 17 and the timing controller 8 and a single output connected to the IN token holder circuit 16. The above described first logic gate G1 receives the lock signal from the oscillator 17 and also receives an IN token transmission timing signal 18 from the timing controller 8 so that the IN token transmission timing signal 18 is transmitted to the token transmitter circuit 4 for transmitting the token. An ACK token transmitter circuit 19 is also provided which is connected to an USB I/O buffer 5 which is further connected to the USB function. A third logic gate G3 is also provided which has two inputs connected to the oscillator 17 for receiving the clock signal and connected to the timing controller 8 for receiving an ACK token transmission timing signal 21 and also has an output connected to the ACK token transmitter circuit 19. The token transmitter circuit 4 is also connected to the USB I/O buffer 5 which is further connected to the USB function. The IN token is also transmitted from the token transmitter circuit 4 to the IN token detecting circuit 6 so that the IN token detecting circuit 6 then sends the timing controller 8 the notice to the effect that the token transmitted from the token transmitter circuit 4 is the IN token, whereby the timing controller 8 outputs an IN token holding timing signal 15 which is then transmitted to the first logic gate G1 to discontinue the transmission of the token from the token transmitter circuit 4 to the IN token holder circuit 16 and also to disconnect the IN token holder circuit 16 from the USB I/O buffer 5 for allowing the IN token holder circuit 16 holds the IN token. If the timing controller 8 receives both the NAK detecting signal 11 and the EOP detecting signal 14, then the timing controller 8 sends the IN token transmission timing signal 18 to one input of the second logic gate G2. Since another input of the second logic gate G2 receives the clock signal from the oscillator 17, then the clock signal is transmitted to the IN token holding circuit 16. Upon receipt of the clock signal from the oscillator 17, the IN token holder circuit 16 transmits the IN token which is then transmitted through the USB I/O buffer 5 to the USB function. The USB function then returns a return packet to the USB I/O buffer 5. If the timing controller 8 inactivates the ACK token transmission timing signal 21 which is then transmitted to the third logic gate G3, then the third logic gate G3 discontinues-transmission of the clock signal from the oscillator 17 to the ACK token transmitter circuit 19 and the ACK token transmitter circuit 19 is made disconnected from the USB I/O buffer 5. If the timing controller 8 activates the ACK token transmission timing signal 21 which is, then transmitted to the third logic gate G3, then the third logic gate G3 allows the transmission of the clock signal from the oscillator 17 to the ACK token transmitter circuit 19 and the ACK token transmitter circuit 19 is made connected to the USB I/O buffer 5, whereby the ACK token is transmitted from the ACK token transmitter circuit 19 through the USB I/O buffer 5 to the USB function. A receiving shift register 9 is also provided which is connected to the USB I/O buffer 5 for receiving the return packet through the USB I/O buffer 5 from the USB function. A packet termination of the return packets from the USB function will hereinafter be referred to as "EOP". An EOP detecting circuit 13 is also provided which has an input terminal connected to the USB I/O buffer 5 for detecting the packet termination of the return packets from the USB function and an output terminal connected to the timing controller 8 for sending the timing controller 8 an EOP-detected signal 14 in order to inform the timing controller 8 of the packet termination of the return packets from the USB function. A packet type judging circuit 10 is further provided which is connected to the receiving shift register 9 for judging the kind of the return packet. The return packet from the USB function is transmitted through the USB I/O buffer 5 tow the receiving shift register 9, whereby the receiving shift register 9 performs the serial/parallel conversions to the received packet, before the packet type judging circuit 10 receives the serial/parallel-converted packet from the receiving shift register 9, so that the packet type judging circuit 10 judges the packet type. If the packet type judging circuit 10 judges the packet to be of NAK type, then the packet type judging circuit 10 generates an NAK detecting signal 11 which is transmitted to the timing controller 8. If the packet type judging circuit 10 judges the packet to be of STALL type, then the packet type judging circuit 10 generates a STALL detecting signal 12 which is also transmitted to the timing controller 8. If the packet type judging circuit 10 judges the packet to be of DATA type, then the packet type judging circuit 10 generates a DATA detecting signal 20 which is also transmitted to the timing controller 8.

If the IN token detecting circuit 6 detects the IN token, then the IN token detecting circuit 6 sends the timing controller 8 the IN token detecting signal 7. If the timing controller 8 receives the IN token detecting signal 7 from the IN token detecting circuit 6, then the timing controller 8 activates the IN token holding timing signal 15, so that the IN token holding circuit 16 holds the IN token transmitted from the token transmitter circuit 4. Meanwhile, the activated IN token holding timing signal 15 is transmitted to one input of the first logic gate G1. Since the other input of the first logic gate also receives the clock signal from the oscillator 17, the transmission of the clock signal from the oscillator 17 to the token transmitter circuit 4 is discontinued.

If the timing controller 8 receives the NAK detecting signal 11 from the packet type judging circuit 10 and also receives the EOP detecting signal 14 from the EOP detecting circuit 13, then the timing controller 8 activates the IN token transmission timing signal 18 which is then transmitted to the one input of the second logic gate G2. Since the other input of the second logic gate G2 also receives the clock signal from the oscillator 17, then the second logic gate G2 allows the transmission of the is) clock signal from the oscillator 17 to the IN token holding circuit 16, whereby the IN token holding circuit 16 transmits the held IN token through the USB 1(0 buffer 5 to the USB function.

If the timing controller 8 receives the STALL detecting signal 12 from the packet type judging circuit 10, then the timing controller 8 inactivates the ACK token transmission timing signal 21 whereby the third logic gate G3 discontinues the transmission of the clock signal from the oscillator 17 to the ACK token transmitter circuit 19 and also the ACK token transmitter circuit 19 is made disconnected from the USB I/O buffer 5.

If the timing controller 8 receives the DATA detecting signal 20 from the packet type judging circuit 10, then the timing controller 8 activates the ACK token transmission timing signal 21 whereby the third logic gate G3 allows the transmission of the clock signal, from the oscillator 17 to the ACK token transmitter circuit 19 and also the ACK token transmitter circuit 19 is made connected to the USB I/O buffer 5, whereby it is unnecessary to do programming of ACK token in preparation of the test pattern, thereby improving the efficiency of preparation of the test pattern.

Figure 14:
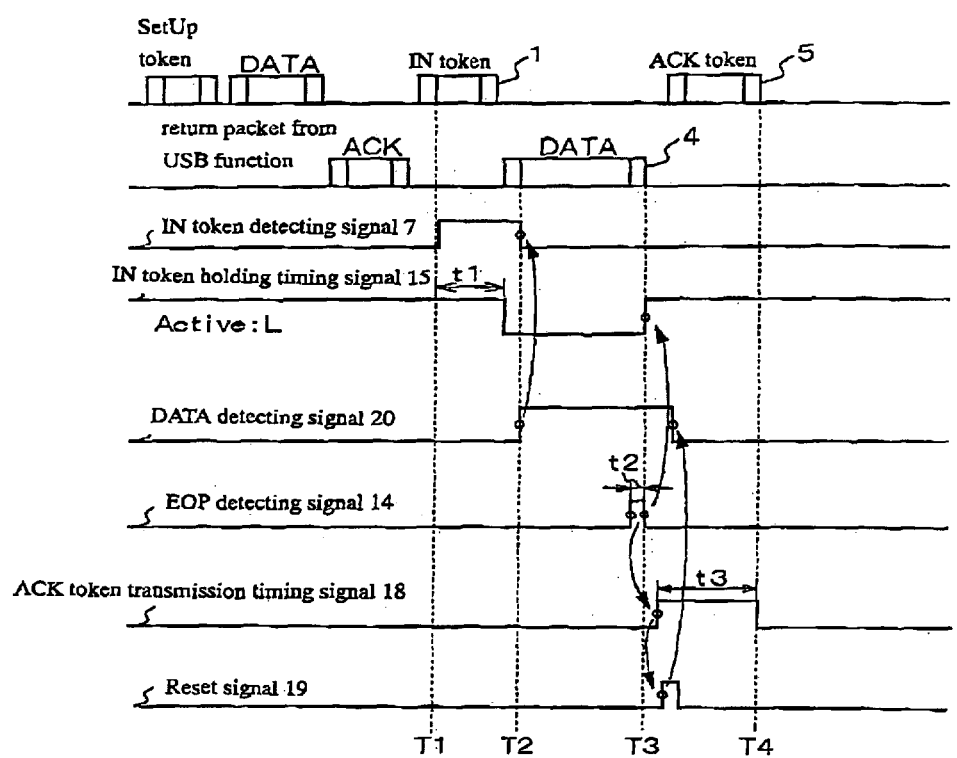
FIG. 14 is a timing chart illustrative of individual signals transmitted in the novel USB function evaluator of FIG. 13 to explain operations thereof.

FIG. 14 is a timing chart illustrative of individual signals transmitted in the novel USB function evaluator of FIG. 13 to explain operations thereof.

After the IN token 1 is transmitted through the USB I/O buffer 5 to the USB function, the return packet 4 of DATA type is then returned from the USB function through the USB I/O buffer 5 and the receiving shift register 9 to the packet type judging circuit 10. At a timing "T2", the packet type judging circuit 10 activates the DATA detecting signal 20. Also the return packet 4 of DATA type is returned from the USB function through the USB I/O buffer 5 to the EOP detecting circuit 13 whereby the EOP detecting circuit 13 activates the EOP detecting signal 14 in a time period "t2". The activated DATA detecting signal 20 is then transmitted to the timing controller 8, whereby the timing controller 8 activates the ACK token transmission timing signal 21, whereby the ACK token transmitter circuit 19 receives the clock signal from the oscillator 17 and also the ACK token transmitter circuit 19 is made connected to the USB I/O buffer 5. The ACK token transmission timing signal 21 is activated in a time period "t3" which corresponds to a token length of the ACK token 5. The ACK token transmission timing signal 21 is inactivated at a timing "T4" whereby the transmission of the clock signal to the ACK token transmitter circuit 19 is discontinued and also the ACK token transmitter circuit 19 is made disconnected from the USB I/O buffer 5.

In this embodiment, the automatic transmission of ACK token is made, in place of the host computer, for the return packet of DATA type from the USB function in accordance with the USB protocol. If the return packet from the USB function is of STALL type, then the ACK token is not transmitted from the ACK token transmitter circuit 19.

This allows the programming without consideration of the need and transmission timing of the ACK" token, whereby the number of processes for preparing the test pattern is reduced.

The above novel system and method for evaluating the USB function provide the following additional advantages.

As to the first additional advantage, a single IN token programming results in that until the USB function has been prepared to return the DAR packet, transmission of IN token is automatically repeated so as to automatically detect the return packet for subsequent transmission of the next token. As a result, it is possible to do programming of token to be supplied to the USB function to the USB function evaluator without consideration about the necessary time for allowing the USB function to have prepared to return the DATA packet.

As to the second additional advantage, the kind of the return packet from the USB function is automatically detected to judge the retransmission of the IN token or the next IN token and detects the EOP of the return packet for realizing the automatic transmission of the next IN token. It is, therefore, possible to do programming of token to be supplied to the USB function to the USB function evaluator without setting the IN token transmission timing to the USB function depending on the kind and length of the return packet returned from the USB function against the IN token.

In accordance with the USB protocol, the kinds of the return packet from the USB function may include DATA type, NAK type, STALL type and ACK type. The ACK type is to give a notice to the effect that the USB function normally received the tokens and data from the host UM computer, wherein in accordance with the USB protocol, the return timing from the USB function is provided. Since the F/W process by the USB function causes no variation in the return timing, it is possible to set a constant idling timing for preparing the test pattern. It is unnecessary that the packet judging circuit judges the packet type.

As results of the above first and second advantages, only the single test pattern preparation is necessary for realizing the effective and efficient evaluation to the USB functions.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which ran within the spirit and scope of the present invention.

What is claimed is:

1. A universal serial bus function evaluator connected between, a computer and an universal serial bus function, said universal serial bus function evaluator comprising:

a token storage memory for storing a token transmitted from said computer;

a packet type judging circuit for judging a type of a return data packet returned from said universal serial bus function; and a functional circuit connected to said token storage memory for fetching IN token from said token storage memory and holding the same, and said functional circuit also being connected to said packet type judging circuit for receiving an information about the type of said return data packet from said packet type judging circuit, so that if said return data packet is of NAK type, then said functional circuit automatically transmits the IN token held therein to said universal serial bus function repeatedly until said return data packet is of either DATA type or STALL type, then said functional circuit cancels the held IN token.

2. The universal serial bus function evaluator as claimed in claim 1, wherein said functional circuit comprises:

an oscillator for generating a clock signal;

an IN token holding circuit connected to said oscillator for receiving said clock signal and also connected to said token storage memory for fetching IN token from said token storage memory and holding the same; and a timing controller connected to said oscillator for receiving said clock signal and also connected to said packet type judging circuit for receiving an information about the type of said return data packet, and said timing controller also connected to said IN token holding circuit for controlling said IN token holding circuit both in a holding timing for holding said IN token and in a transmitting timing for transmitting said IN token to said universal serial bus function.

3. The universal serial buts function evaluator as claimed in claim 2, wherein said functional circuit further comprises:

an EOP detecting circuit connected to said universal serial bus function for receiving said return packet to detect a packet end of said return packet, and said EOP detecting circuit also connected to said timing controller for sending an EPO detecting signal which represents the packet end to said timing controller.

4. The universal serial bus function evaluator as claimed in claim 1, wherein if said return data packet is of DATA type then said functional circuit not only cancels the held IN token but also transmits ACK token.

5. The universal serial bus function evaluator as claimed in claim 4, wherein said functional circuit comprises:

an oscillator for generating a clock signal;

an IN token holding circuit connected to said oscillator for receiving said clock signal and also connected to said token storage memory for fetching IN token from said token storage memory and holding the same;

an ACK token transmission circuit connected to said oscillator for receiving said clock signal; and a timing controller connected to said oscillator for receiving said clock signal and also connected to said packet type judging circuit for receiving an information about the type of said return data packet, and said timing controller also connected to said IN token holding circuit for controlling said IN token holding circuit both in a holding timing for holding said IN token and in a transmitting timing for transmitting said IN token to said universal serial bus function, so that if said return data packet is of DATA type, then said timing controller allows said ACK token transmission circuit to transmit an ACK token to said universal serial bus function.

6. A universal serial bus function evaluator connected between a computer and an universal serial bus function, said universal serial bus function evaluator comprising:

a token storage memory for storing a token transmitted from said computer;

a token transmission circuit connected to said token storage memory for transmitting a token stored in said token storage memory;

an IN token detecting circuit connected to said token transmission circuit;

an oscillator for generating a clock signal;

an IN token holding circuit connected to said oscillator for receiving said clock signal and also connected to said token transmission circuit for receiving an IN token from said token transmission circuit and holding the same;

a receiving shift register being connected to a universal serial bus function for receiving a return packet from said universal serial bus function;

a packet type judging circuit connected to said receiving shift register for receiving said return packet and judging a type of said return packet;

an EOP detecting circuit connected to said universal serial bus function for receiving said return packet to detect a packet end of said return packet;

a timing controller connected to said oscillator for receiving said clock signal and also connected to said EOP detecting circuit for receiving an EOP detecting signal which represents said packet end of said return packet, said timing controller also connected to said packet type judging circuit for receiving an information about the type of said return packet, and said timing controller also connected to said IN token holding circuit for controlling said IN token holding circuit both in a holding timing for holding said IN token and in a transmitting timing for transmitting said IN token to said universal serial bus function, so that if said return packet is of NAK type and said timing controller receives both said return packet of NAK type and said EOP detecting signal, then said timing controller allows said IN token holding circuit to transmit the IN token held therein to said universal serial bus function repeatedly until said return data packet is of either DATA type or STALL type, then said timing controller instructs said IN token holding circuit to hold said IN token therein.

7. The universal serial bus function evaluator as claimed in claim 6, further comprising an ACK token transmission circuit connected to said oscillator for receiving said clock signal, and if said return packet is of DATA type, then said timing controller allows said ACK token transmission circuit to transmit an ACK token to said universal-serial bus function.

8. A universal serial bus function evaluating system connected between a computer and an universal serial bus function, said universal serial bus function evaluating system comprising:

means for storing a token transmitted from said computer;

means for judging a type of a return data packet returned from said universal serial bus function;

means for fetching IN token from said storing means and holding the same;

means for receiving an information about the type of said return data packet from said packet type judging circuit, so that if said return data packet is of NAK type, then said functional circuit automatically transmits the IN token held therein to said universal serial bus function repeatedly until said return data packet is of either DATA type or STALL type, then said functional circuit cancels the held IN token.

* * * * *